US007818507B2

(12) United States Patent
Yamazaki et al.

(10) Patent No.: US 7,818,507 B2
(45) Date of Patent: Oct. 19, 2010

(54) METHODS AND APPARATUS FOR FACILITATING COHERENCY MANAGEMENT IN DISTRIBUTED MULTI-PROCESSOR SYSTEM

(75) Inventors: Takeshi Yamazaki, Kanagawa (JP); Jeffrey Douglas Brown, Rochester, MN (US); Scott Douglas Clark, Rochester, MN (US); Charles Ray Johns, Austin, TX (US)

(73) Assignees: Sony Computer Entertainment Inc., Tokyo (JP); International Business Machines Corporation, Armonk, NY (US)

( * ) Notice: Subject to any disclaimer, the term of this patent is extended or adjusted under 35 U.S.C. 154(b) by 964 days.

(21) Appl. No.: 11/098,621

(22) Filed: Apr. 4, 2005

(65) Prior Publication Data

US 2006/0251070 A1 Nov. 9, 2006

(51) Int. Cl.
G06F 12/00 (2006.01)
G06F 13/00 (2006.01)
G06F 13/28 (2006.01)
(52) U.S. Cl. .................. 711/141; 711/146; 718/1
(58) Field of Classification Search .............. 711/146, 711/141; 718/1
See application file for complete search history.

(56) References Cited

U.S. PATENT DOCUMENTS 4,754,480 A * 6/1988 Mattis et al. ............. 379/279
5,349,583 A * 9/1994 Christensen et al. ......... 370/434
5,546,560 A * 8/1996 Kranich ....................... 711/141
5,968,146 A 10/1999 Tanaka et al.
6,298,418 B1 * 10/2001 Fujiwara et al. ............. 711/144
6,526,491 B2 2/2003 Suzuoki et al.
6,636,926 B2 * 10/2003 Yasuda et al. ............... 710/305
6,742,145 B2 * 5/2004 Bailey et al. ................. 714/42
2003/0079085 A1 * 4/2003 Ang ............................. 711/122

FOREIGN PATENT DOCUMENTS

JP          07200505 A      8/1995
JP           9319693 A     12/1997
JP        2002024198 A      1/2002

OTHER PUBLICATIONS

Office action for corresponding Japanese application No. 2006102826, dated Sep. 15, 2009.
Office Action for corresponding Japanese Application JP 2006-102826, dated May 18, 2010.

* cited by examiner

Primary Examiner—Stephen C Elmore
Assistant Examiner—Mark A Giardino, Jr.
(74) Attorney, Agent, or Firm—Matthew B. Dernier, Esq.; Gibson & Dernier LLP

(57) ABSTRACT

Methods and apparatus provide for sending a data command from a first of a plurality of devices to a first address concentrator within a first of a plurality of processing systems; selecting one of the other processing systems, the selected processing system having data addressed by the data command stored therein; sending the data command to a first address concentrator of the selected processing system; and broadcasting the data command from the first address concentrator of the selected processing system to a second address concentrator in each of the processing systems.

34 Claims, 7 Drawing Sheets

504

METHODS AND APPARATUS FOR FACILITATING COHERENCY MANAGEMENT IN DISTRIBUTED MULTI-PROCESSOR SYSTEM

BACKGROUND

The present invention relates to methods and apparatus for intra-processing system data transfers in multi-processing system.

In recent years, there has been an insatiable desire for faster computer processing data throughputs because cutting-edge computer applications involve real-time, multimedia functionality. Graphics applications are among those that place the highest demands on a processing system because they require such vast numbers of data accesses, data computations, and data manipulations in relatively short periods of time to achieve desirable visual results. These applications require extremely fast processing speeds, such as many thousands of megabits of data per second. While some processing systems employ a single processor to achieve fast processing speeds, others are implemented utilizing multi-processor architectures. In multi-processor systems, a plurality of sub-processors can operate in parallel (or at least in concert) to achieve desired processing results.

For example, a multi-processor system may include a plurality of processors all sharing a common system memory, where each processor also has a local memory in which to execute instructions. The multi-processor system may also include an external interface, for example, to connect with other processing systems and/or other external devices to permit the sharing of data and resources. While this can achieve significant benefits in functionality, processing power, etc., the sharing of data may require data coherency management in some circumstances.

SUMMARY OF THE INVENTION

In accordance with one or more features described herein, methods and apparatus provide for: sending a data command from a first of a plurality of devices to a first address concentrator within a first of a plurality of processing systems; selecting one of the other processing systems, the selected processing system having data addressed by the data command stored therein; sending the data command to a first address concentrator of the selected processing system; and broadcasting the data command from the first address concentrator of the selected processing system to a second address concentrator in each of the processing systems.

The methods and apparatus may also include broadcasting the data command from each second address concentrator to each of a plurality of devices within its processing system. Preferably, the method further includes receiving coherency responses to the broadcasted data command at each of the second address concentrators from the devices within its processing system. Also included may be sending the coherency responses from each of the second address concentrators to the first address concentrator of the selected processing system.

It is preferred that the coherency responses received at the first address concentrator of the selected processing system are combined and broadcasted from the first address concentrator of the selected processing system to each second address concentrator in each of the processing systems. The methods and apparatus may also include broadcasting the combined coherency responses from each second address concentrator to each of the devices within its processing system.

In accordance with one or more further inventive aspects, a processing system includes: a plurality of processors capable of being coupled to a shared memory, at least one of the processors issuing a data command requesting data; a first address concentrator operable to receive the data command; and a second address concentrator operable to: (i) receive the data command, (ii) select one of a plurality of other processing systems, the selected processing system having data addressed by the data command stored therein, and (iii) send the data command to a first address concentrator of the selected processing system.

In accordance with one or more further inventive aspects, an apparatus includes: a first processing system, including: a plurality of processors capable of being coupled to a shared memory, at least one of the processors issuing a data command requesting data, a first address concentrator operable to receive the data command, and a second address concentrator operable to receive the data command. The apparatus may also include: a plurality of other processing systems, each including: a plurality of processors capable of being coupled to a respective shared memory, a first address concentrator, and a second address concentrator. The second address concentrator of the first processing system is preferably further operable to (i) select one of the other processing systems, the selected processing system having data addressed by the data command stored therein, and (iii) send the data command to the first address concentrator of the selected processing system.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PRESENT INVENTION

Figure 1:
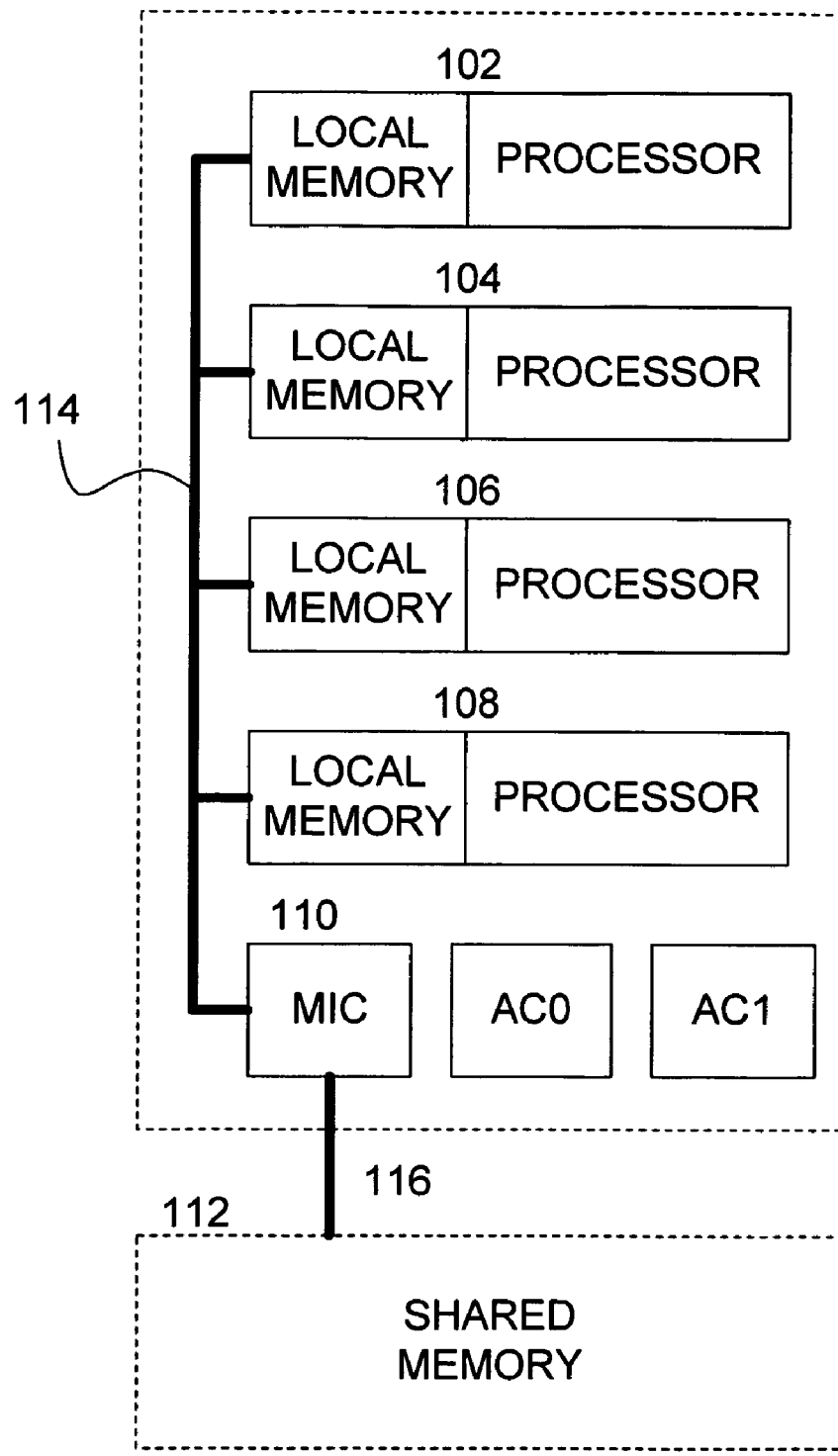
FIG. 1 is a block diagram illustrating the structure of a multi-processing system having two or more sub-processors accordance with one or more aspects of the present invention.

With reference to the drawings, wherein like numerals indicate like elements, there is shown in FIG. 1 a processing system 100 suitable for implementing one or more features of the present invention. For the purposes of brevity and clarity, the block diagram of FIG. 1 will be referred to and described herein as illustrating an apparatus 100, it being understood, however, that the description may readily be applied to various aspects of a method with equal force.

The processing system 100 includes a plurality of processors 102, 104, 106, and 108, it being understood that any number of processors may be employed without departing from the spirit and scope of the invention. The processing system 100 also preferably includes a memory interface circuit 110, a shared memory 112, and first and second address concentrators AC0, AC1, respectively. At least the processors 102, 104, 106, 108, and the memory interface circuit 110 are preferably coupled to one another over a bus system 114 that is operable to transfer data to and from each component in accordance with suitable protocols.

Each of the processors 102, 104, 106, 108 may be of similar construction or of differing construction. The processors may be implemented utilizing any of the known technologies that are capable of requesting data from the shared (or system) memory 112, and manipulating the data to achieve a desirable result. For example, the processors 102, 104, 106, 108 may be implemented using any of the known microprocessors that are capable of executing software and/or firmware, including standard microprocessors, distributed microprocessors, etc. By way of example, one or more of the processors 102, 104, 106, 108 may be a graphics processor that is capable of requesting and manipulating data, such as pixel data, including gray scale information, color information, texture data, polygonal information, video frame information, etc.

One or more of the processors 102, 104, 106, 108 of the system 100 may take on the role as a main (or managing) processor. The main processor may schedule and orchestrate the processing of data by the other processors.

The memory interface circuit 110 is preferably operable to facilitate data transfers between the processors 102, 104, 106, 108 and the shared memory 112 such that the processors may execute application programs and the like. By way of example, the memory interface circuit 110 may provide one or two high-bandwidth channels into the shared memory and may be adapted to be a slave to the bus system 114. Any of the known memory interface technologies may be employed to implement the memory interface circuit 110.

The system memory 112 is preferably a dynamic random access memory (DRAM) coupled to the processors 102, 104, 106, 108 through the memory interface circuit 110. Although the system memory 112 is preferably a DRAM, the memory 112 may be implemented using other means, e.g., a static random access memory (SRAM), a magnetic random access memory (MRAM), an optical memory, a holographic memory, etc.

Turning again to the processors, each processor 102, 104, 106, 108 preferably includes a processor core and a local memory in which to execute programs. These components may be integrally disposed on a common semi-conductor substrate or may be separately disposed as may be desired by a designer. The processor core is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processor core may include an instruction buffer, instruction decode circuitry, dependency check circuitry, instruction issue circuitry, and execution stages.

The local memory is coupled to the processor core via a bus and is preferably located on the same chip (same semiconductor substrate) as the processor core. The local memory is preferably not a traditional hardware cache memory in that there are no on-chip or off-chip hardware cache circuits, cache registers, cache memory controllers, etc. to implement a hardware cache memory function. As on chip space is often limited, the size of the local memory may be much smaller than the shared memory 112.

The processors preferably provide data access requests to copy data (which may include program data) from the system memory 112 over the bus system 114 into their respective local memories for program execution and data manipulation. The mechanism for facilitating data access may be implemented utilizing any of the known techniques, for example the direct memory access (DMA) technique.

The first and second address concentrators AC0, AC1 are operable to facilitate data coherency as between the processing system 100 and any other external devices, such as other processing systems. The details as to the function and operation of the address concentrators AC0, AC1 will be discussed in more detail hereinbelow.

Figure 2:
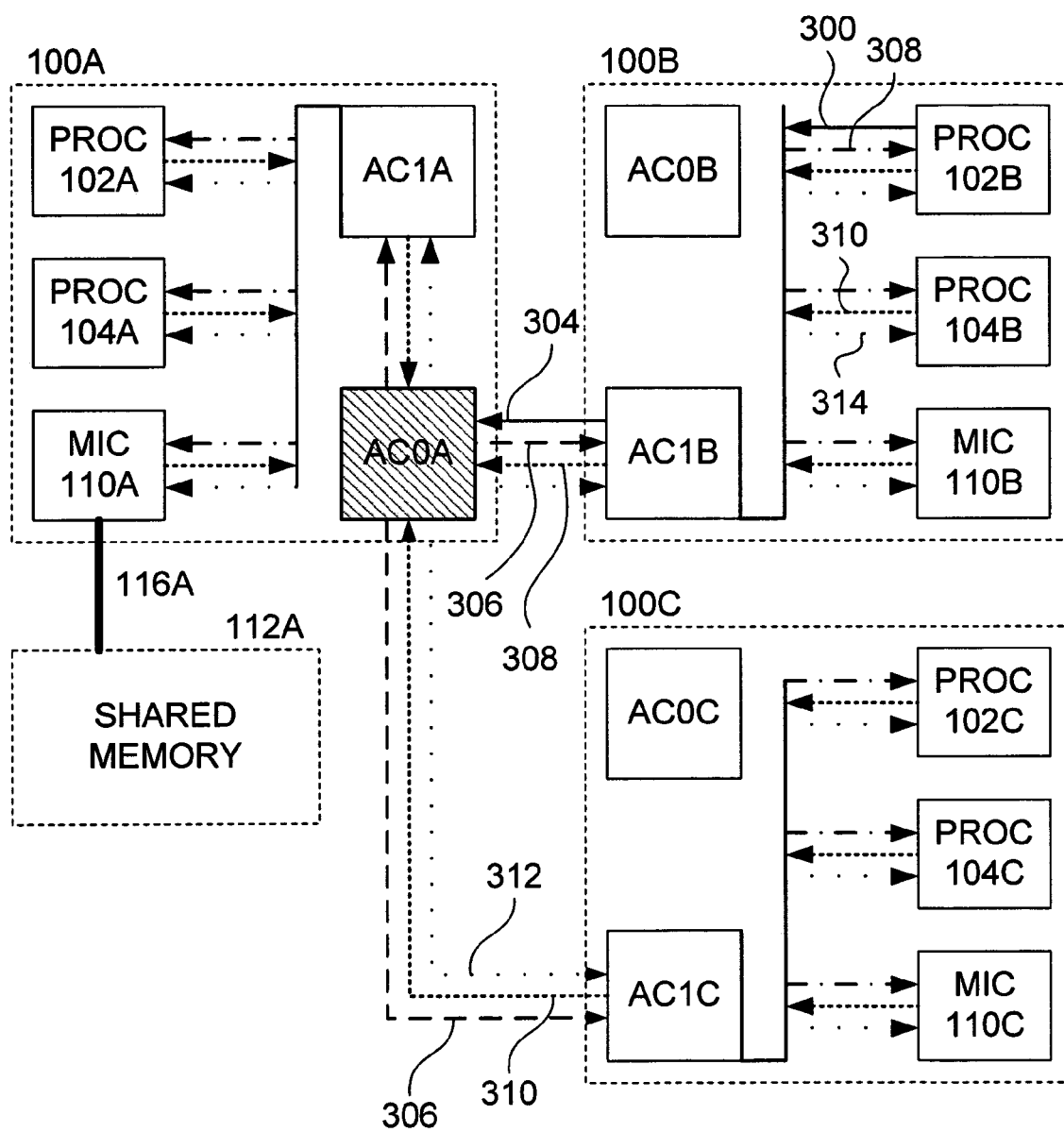
FIG. 2 is a block diagram illustrating the structure of a distributed system having two or more processing systems interconnected in accordance with one or more aspects of the present invention.

With reference to FIG. 2, a plurality of processing systems 100A, 100B, 100C, etc., may be coupled to one another by way of appropriate networking protocols. Each of the processing systems may have the structure shown in FIG. 1 and/or similar constructions. To achieve this interconnection between systems, each processing system 100 may include an external interface circuit (not shown) that is adapted to facilitate data transfers between, for example, the system 100A and one or more of the other systems 100B, 100C over a communications channel, such as a bus extension. Preferably, the external interface circuit is adapted to exchange non-coherent traffic with an external device and/or operate coherently by extending the bus system 114 to the other processing systems. Although any of the known external interface technologies may be employed to implement the external interface circuit 110, it is preferred that the circuit combines command and data into packetized envelopes and insures successful delivery of the envelopes to/from the external device.

Each of the processors (only processors 102 and 104 being shown) is preferably operable to obtain data stored in any of the shared memories 112, including its own shared memory and the shared memories of the other processing systems 100. For example, the processor 102B of the processing system 100B is preferably operable to obtain data from and store data in the shared memory 112A of the processing system 100A. In this regard, the memory space seen by each processor may encompass all or some of the shared memories 112. Under these circumstances, it may be desirable to maintain data coherency as to data that may be obtained by any particular processor. At least part of the data coherency scheme is preferably carried out by the address concentrators AC0 and AC1 of one or more of the processing systems 100.

For the purposes of illustrating the function and operation of the address concentrators AC0, AC1, reference will now be made to FIGS. 2 and 3, which illustrate but one example of how data coherency may be achieved in accordance with some inventive aspects. In this regard, it is assumed for the purposes of this example that data coherency among three processing systems 100A, 100B and 100C is desired. The example is initiated when at least one of the processors issues a data command requesting data stored in one of the processing systems 100. For example, processor 102B of the processing system 100B may issue a data command that, among other places, is sent to the second address concentrator AC1B of the processing system 100B (action 300).

Figure 3:
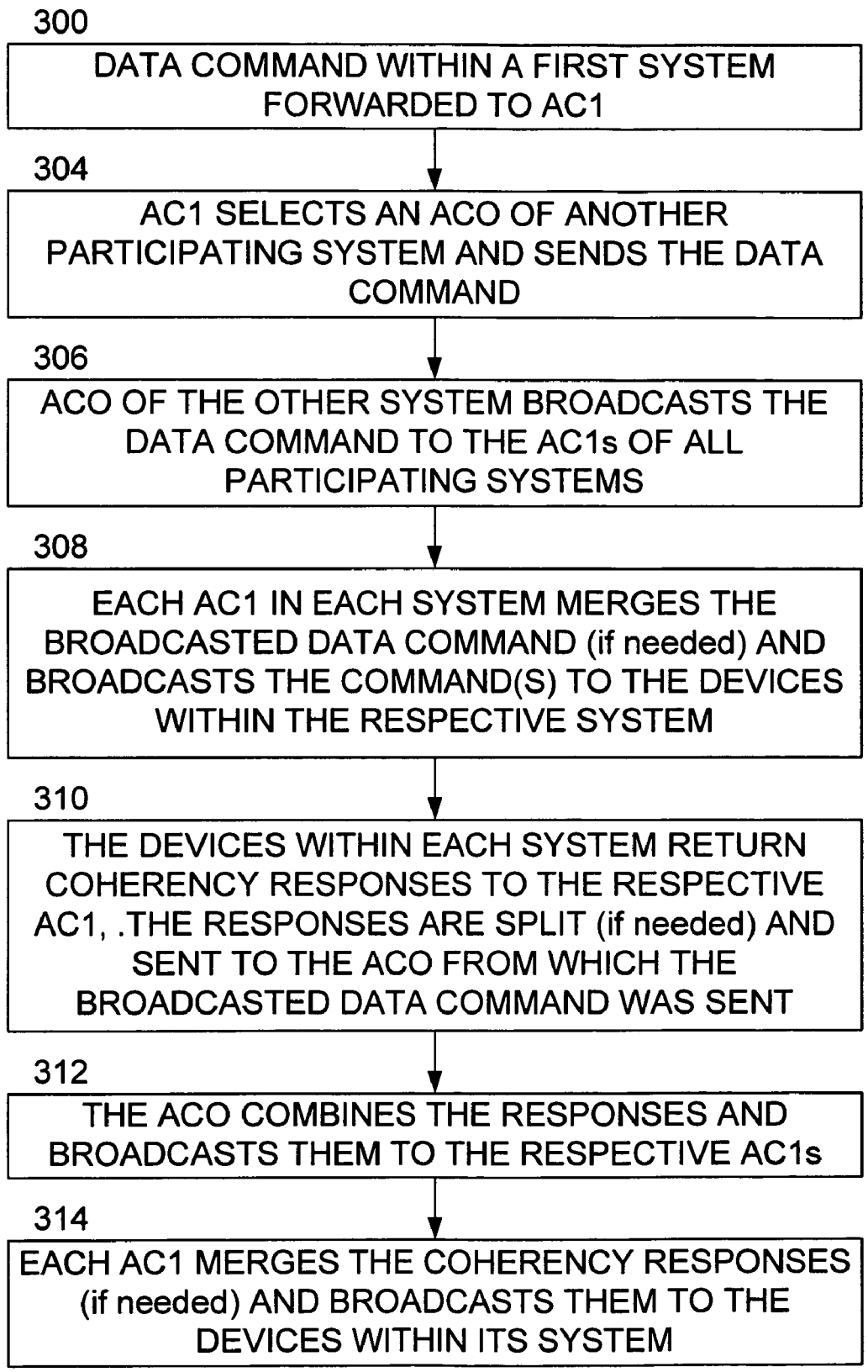
FIG. 3 is a flow diagram illustrating process steps that may be carried out by system of FIG. 2.

Next, the second address concentrator AC1B of the processing system 100B selects one of the other processing systems 100A or 100C in which the data addressed by the data command are stored (action 304, FIG. 3). In this example, it is assumed that the data addressed by the data command are stored in the shared memory 112A of the processing system 100A. Therefore, the second address concentrator AC1B of the processing system 100B preferably sends the data command to the first address concentrator AC0A of the processing system 100A (action 304).

Alternatively, at action 300, the first address concentrator AC0B may make a determination as to whether the data addressed by the command are within the memory space of the second processing system 100B (e.g., within the shared memory 112 thereof as opposed to the shared memory 112A). If the data are within the memory space of the processing system 100B, then actions 300 and 304 may be omitted and the process may pick up at action 306 (below).

Next, the first address concentrator AC0A of the processing system 100A (the selected processing system) is preferably operable to broadcast the data command to the second address concentrator AC1 in each of the processing systems 100A, 100B, 100C (action 306). Each of the second address concentrators AC1A, AC1B, AC1C is preferably operable to broadcast the data command to each of the plurality of processors (and/or other devices, such as the MIC 110) in its processing system 100 (action 308). It is noted that each second address concentrator AC1 may be operable to merge a plurality of broadcasted data commands in the event that more than one first address concentrator AC0 broadcasts a respective data command to the second address concentrator AC1. For the purposes of this example, however, it is assumed that only one first address concentrator AC0A is involved in broadcasting the data command issued by the processor 102B to the second address concentrators AC1A, AC1B, AC1C.

In response to the broadcasted data command within each processing system 100, each of the second address concentrators AC1 is preferably operable to receive coherency responses from the processors (and/or other devices) in its processing system (action 310). Thus, for example, the second address concentrator AC1C may receive a coherency response from each of processor 102C, processor 104C, and MIC 110C. Next, each of the second address concentrators AC1 is preferably operable to send the coherency responses to the first address concentrator AC0A of the selected processing system 100A.

At action 312, the first address concentrator AC0A is preferably operable to combine the coherency responses and broadcast the combined coherency responses to the second address concentrator AC1 in each of the processing systems 100A, 100B, and 100C. In response, the respective second address concentrators AC1 are operable to broadcast the combined coherency responses to each of the processors (and/or other devices) within its processing system (action 314). It is noted that each second address concentrator AC1 may be operable to merge the combined coherency responses prior to broadcasting them to the processors (and/or other devices) when more than one first address concentrator AC0 is managing a coherency action. Again, in this example only the first address concentrator AC0A of the processing system 100A is engaging in coherency management of this type.

Figure 4:
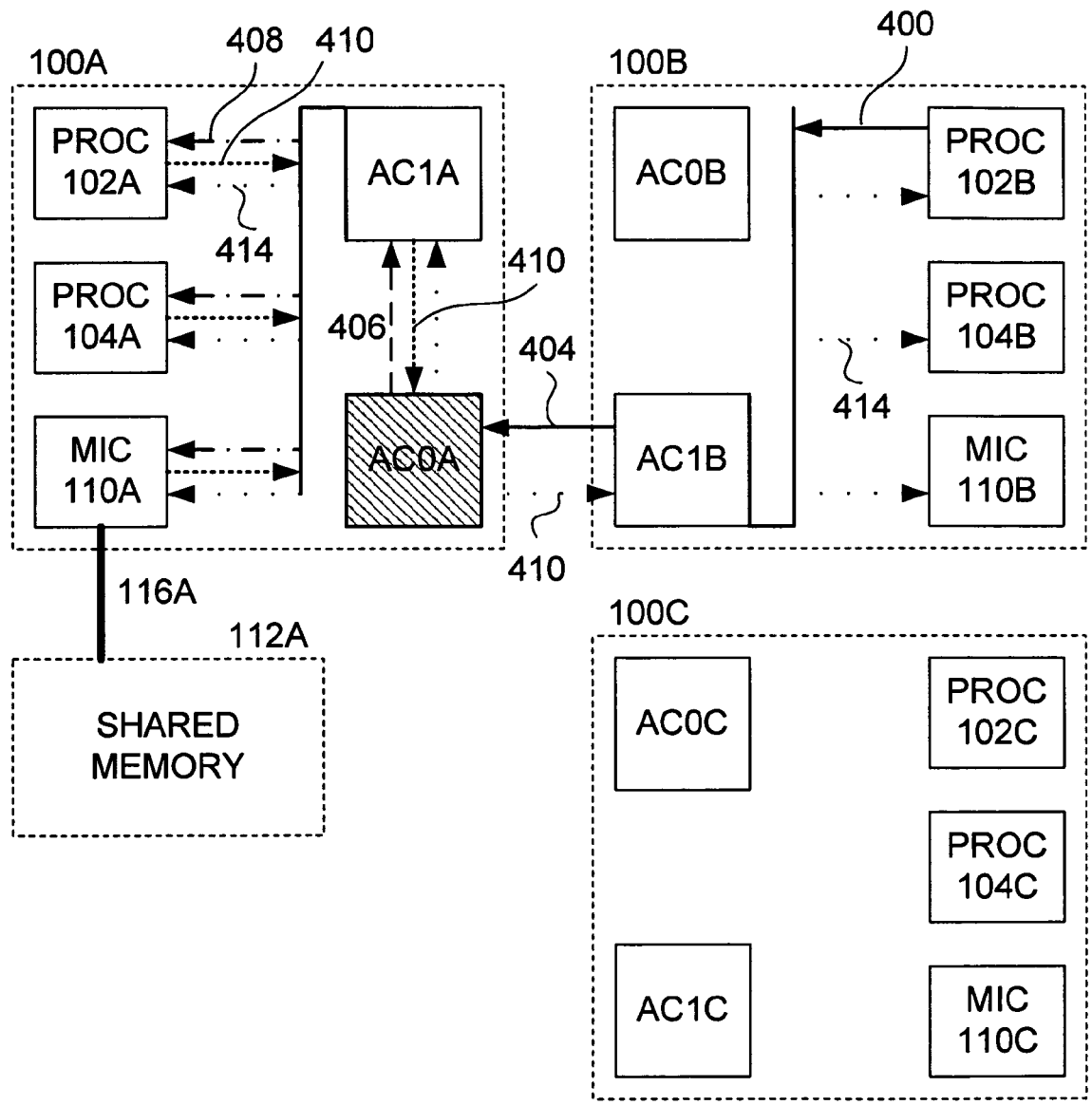
FIG. 4 is a block diagram illustrating alternative functionality of the system of FIG. 2.

Reference is now made to FIG. 4, which is a block diagram illustrating alternative inventive features. In some instances, it may be desirable to limit the extent of the data coherency objective, such as between only two processing systems 100A, 100B. In this scenario, significantly less control traffic is necessary to achieve the data coherency objective. As with the previous embodiments, the operation of the alternative approach illustrated in FIG. 4 will be discussed by way of an example. In particular, processor 102B of the processing system 100B may issue a data command that, among other places, is sent to the second address concentrator AC1B of the processing system 100B (action 400).

Next, the second address concentrator AC1B of the processing system 100B selects one of the other processing systems 100A or 100C in which the data addressed by the data command are stored (action 404). In this example, it is assumed that the data addressed by the data command are stored in the shared memory 112A of the processing system 100A. Therefore, the second address concentrator AC1B of the processing system 100B preferably sends the data command to the first address concentrator AC0A of the processing system 100A.

Alternatively, at action 402, the first address concentrator AC0B may make a determination as to whether the data addressed by the command are within the memory space of the second processing system 100B (e.g., within the shared memory 112 thereof as opposed to the shared memory 112A). If the data are within the memory space of the processing system 100B, then actions 402 and 404 may be omitted and the process may pick up at action 406 (below).

Next, the first address concentrator AC0A of the processing system 100A (the selected processing system) is preferably operable to send the data command to the second address concentrator AC1A of the processing system 100A (action 406). This is different from the process of FIG. 2, where the first address concentrator AC0A broadcasted the data command to all of the second address concentrators AC1. The second address concentrator AC1A is then preferably operable to broadcast the data command to each of the plurality of processors (and/or other devices, such as the MIC 110) in its processing system 100A (action 408). It is noted that the second address concentrator AC1A may be operable to merge a plurality of broadcasted data commands in the event that the first address concentrator AC0A sends more than one data command.

In response to the broadcasted data command within the processing system 100A, the second address concentrator AC1A is preferably operable to receive coherency responses from the processors (and/or other devices) at action 410. Next, the second address concentrators AC1A is preferably operable to send the coherency responses to the first address concentrator AC0A. At action 412, the first address concentrator AC0A is preferably operable to combine the coherency responses and broadcast the combined coherency responses to the second address concentrator AC1 in each of the processing systems 100A and 100B. In response, the respective second address concentrators AC1 are operable to broadcast the combined coherency responses to each of the processors (and/or other devices) within its processing system (action 414). It is noted that each second address concentrator AC1 may be operable to merge the combined coherency responses prior to broadcasting them to the processors (and/or other devices) when more than one first address concentrator AC0 is managing a coherency action. Again, in this example only the first address concentrator AC0A of the processing system 100A is engaging in coherency management.

In an alternative embodiment, the system 100 may include a main processor, e.g. processor 102 operatively coupled to the other processors 104, 106, 108 and capable of being coupled to the shared memory 112 over the bus system 114. The main processor 102 may schedule and orchestrate the processing of data by the other processors 104, 106, 108. Unlike the other processors 104, 106, 108, however, the main processor may be coupled to a hardware cache memory, which is operable cache data obtained from at least one of the shared memory 112 and one or more of the local memories of the processors 102, 104, 106, 108. The main processor 102 may provide data access requests to copy data (which may include program data) from the system memory 112 over the bus system 114 into the cache memory for program execution and data manipulation utilizing any of the known techniques, such as DMA techniques.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

Figure 5:
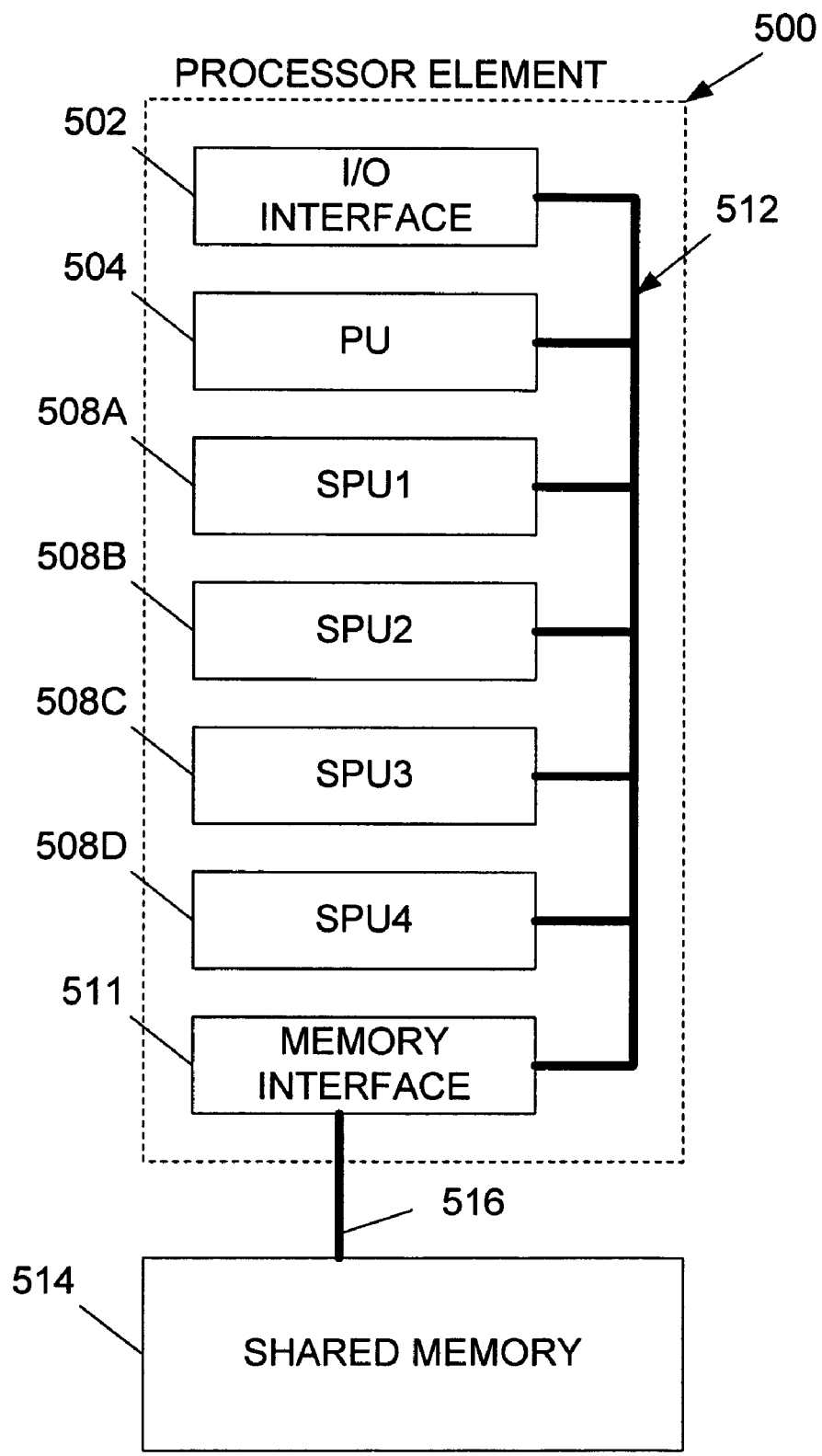
FIG. 5 is a diagram illustrating a preferred processor element (PE) that may be used to implement one or more further aspects of the present invention.

With reference to FIG. 5, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

Figure 6:
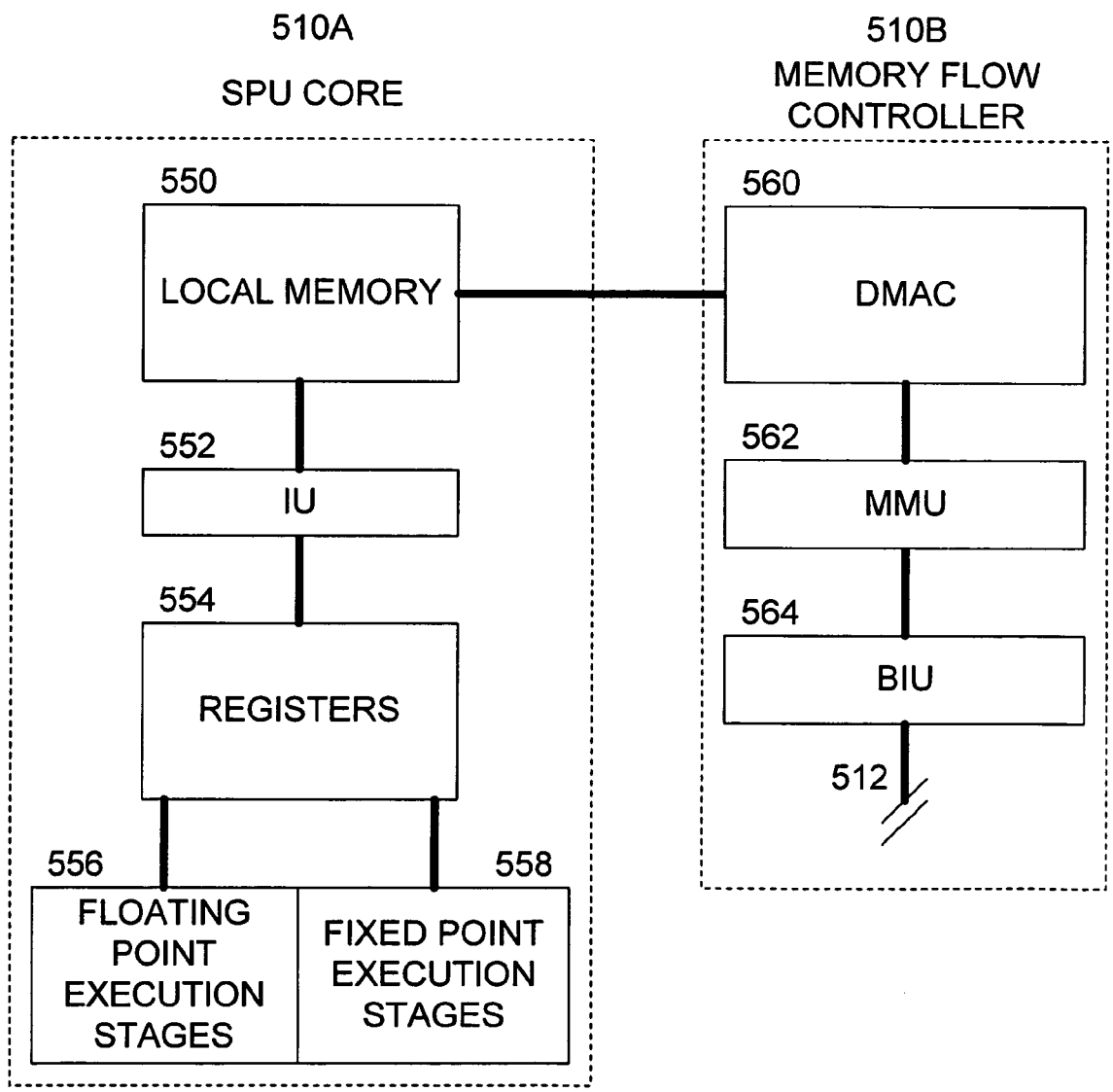
FIG. 6 is a diagram illustrating the structure of an exemplary sub-processing unit (SPU) of the system of FIG. 5 in accordance with one or more further aspects of the present invention.

FIG. 6 illustrates the preferred structure and function of a sub-processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one ore more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 504A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques. Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide $2^{64}$ bytes of effective address space with 4K-, 64K-, 1M-, and 16M-byte page sizes and 256 MB segment sizes. Preferably, the MMU 562 is operable to support up to $2^{65}$ bytes of virtual memory, and $2^{42}$ bytes (4 TeraBytes) of physical memory for DMA commands. The hardware of the MMU 562 may include an 8-entry, fully associative SLB, a 256-entry, 4 way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

Figure 7:
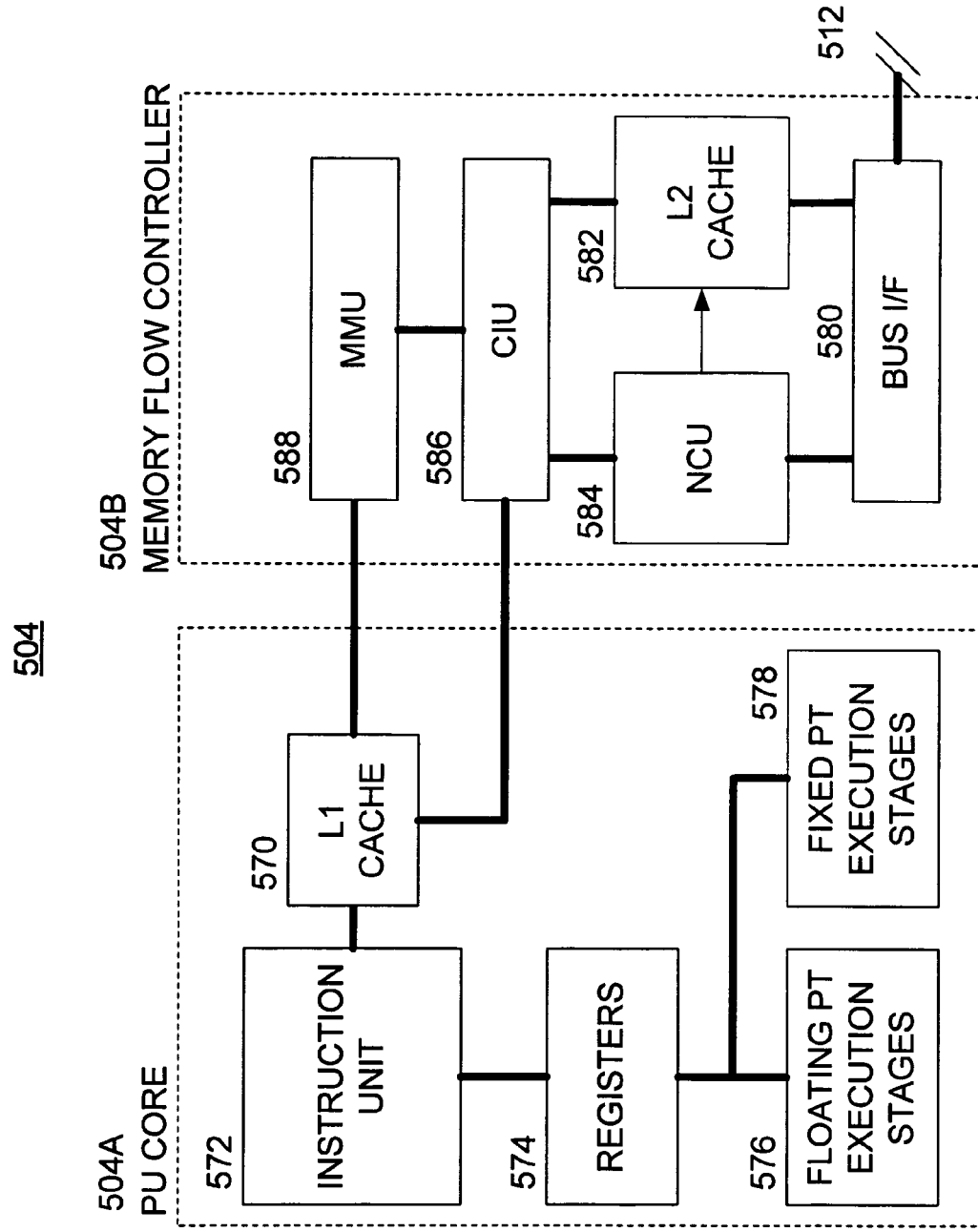
FIG. 7 is a diagram illustrating the structure of an exemplary processing unit (PU) of the system of FIG. 5 in accordance with one or more further aspects of the present invention.

FIG. 7 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queueing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
sending a data command from a first of a plurality of devices to a second address concentrator within a first of a plurality of processing systems, wherein each of the plurality of processing systems includes a first address concentrator and a second address concentrator, and the data command is for requesting data to be read from one of the plurality of processing systems;
selecting one of the other processing systems, the selected processing system storing the data addressed by the data command;
sending the data command to the first address concentrator of the selected processing system from the second address concentrator of the first of the plurality of processing systems, without sending the data command to the first address concentrator of the first of the plurality of processing systems; and
broadcasting the data command from the first address concentrator of the selected processing system to the second address concentrator in each of the processing systems.

2. The method of claim 1, further comprising broadcasting the data command from each second address concentrator to each of a plurality of devices within its processing system.

3. The method of claim 2, further comprising receiving coherency responses to the broadcasted data command at each of the second address concentrators from the devices within its processing system.

4. The method of claim 3, further comprising sending the coherency responses from each of the second address concentrators to the first address concentrator of the selected processing system.

5. The method of claim 4, further comprising:
combining the coherency responses received at the first address concentrator of the selected processing system; and
broadcasting the combined coherency responses from the first address concentrator of the selected processing system to each second address concentrator in each of the processing systems.

6. The method of claim 5, further comprising broadcasting the combined coherency responses from each second address concentrator to each of the devices within its processing system.

7. A method, comprising:
sending a data command from a first of a plurality of devices to a second address concentrator within a first of a plurality of processing systems, wherein each of the plurality of processing systems includes a first address concentrator and a second address concentrator, and the data command is for requesting data to be read from one of the plurality of processing systems;
selecting one of the other processing systems, the selected processing system storing the data addressed by the data command;
sending the data command to the first address concentrator of the selected processing system from the second address concentrator of the first of the plurality of processing systems, without sending the data command to the first address concentrator of the first of the plurality of processing systems; and
sending the data command from the first address concentrator of the selected processing system to the second address concentrator of the selected processing system.

8. The method of claim 7, further comprising broadcasting the data command from the second address concentrator of the selected processing system to each of a plurality of devices within the selected processing system.

9. The method of claim 8, further comprising receiving coherency responses to the broadcasted data command at the second address concentrator from the devices within the selected processing system.

10. The method of claim 9, further comprising sending the coherency responses from the second address concentrator to the first address concentrator of the selected processing system.

11. The method of claim 10, further comprising:
combining the coherency responses received at the first address concentrator of the selected processing system; and
sending the combined coherency responses from the first address concentrator of the selected processing system to the second address concentrator of the first processing system.

12. The method of claim 11, further comprising broadcasting the combined coherency responses from the second address concentrator to each of the devices within the first processing system.

13. A processing system, comprising:
a plurality of processors coupled to a shared memory, at least one of the processors issuing a data command requesting data, which is for requesting data to be read from one of the plurality of processing systems;
a first address concentrator that operates to receive the data command; and a second address concentrator operating to: (i) receive the data command, (ii) select one of a plurality of other processing systems, the selected processing system storing data addressed by the data command, and each of the plurality of the other processing systems includes at least a first address concentrator and a second address concentrator, and (iii) send the data command to the first address concentrator of the selected processing system, without sending the data command to the first address concentrator of the first of the plurality of processing systems, wherein:
the processing system is a selected processing system if selected by the second address concentrator of one of the other processing systems, and
the first address concentrator of the processing system broadcasts a data command received from the second address concentrator of the other processing system to the second address concentrator in each of the other processing systems.

14. The processing system of claim 13, wherein the second address concentrator of the selected processing system broadcasts the data command to each of the plurality of processors.

15. The processing system of claim 14, wherein the second address concentrator of the selected processing system receives coherency responses to the broadcasted data command from the processors.

16. The processing system of claim 15, wherein the second address concentrator of the selected processing system operates to send the coherency responses to the first address concentrator of the selected processing system.

17. The processing system of claim 16, wherein the first address concentrator of the selected processing system operates to: combine the coherency responses; and
broadcast the combined coherency responses to each second address concentrator in each of the processing systems.

18. The processing system of claim 17, wherein the second address concentrator of the selected processing system broadcasts the combined coherency responses to each of the devices within its processing system.

19. The processing system of claim 13, further comprising a local memory coupled to each processor, each processor operating to initiate transfer of data between the shared memory and the local memory such that data may be manipulated within the local memory.

20. The processing system of claim 19, wherein the processors and the local memories are disposed on a common semiconductor substrate.

21. The processing system of claim 20, wherein the processors, the associated local memories, and the shared memory are disposed on a common semiconductor substrate.

22. An apparatus, comprising:
a first processing system, including:
a plurality of processors coupled to a shared memory, at least one of the processors issuing a data command requesting data, which is for requesting data to be read from one of the plurality of processing systems,
a first address concentrator that operates to receive the data command, and
a second address concentrator that operates to receive the data command;
a plurality of other processing systems, each including:
a plurality of processors coupled to a respective shared memory,
a first address concentrator, and
a second address concentrator,
wherein:
the second address concentrator of the first processing system further operates to (i) select one of the other processing systems, the selected processing system storing data addressed by the data command, and (ii) send the data command to the first address concentrator of the selected processing system, without sending the data command to the first address concentrator of the first processing system, and
the first address concentrator of the selected processing system broadcasts the data command to the second address concentrator in each of the other processing systems.

23. The apparatus of claim 22, wherein each of the second address concentrators broadcasts the data command to each of the plurality of processors in its processing system.

24. The apparatus of claim 23, wherein each of the second address concentrators receives coherency responses to the broadcasted data command from the processors in its processing system.

25. The apparatus of claim 24, wherein each of the second address concentrators operates to send the coherency responses to the first address concentrator of the selected processing system.

26. The apparatus of claim 25, wherein the first address concentrator of the selected processing system operates to: combine the coherency responses, and broadcast the combined coherency responses to the second address concentrator in each of the processing systems.

27. The apparatus of claim 26, wherein each of the second address concentrators broadcasts the combined coherency responses to each of the devices within its processing system.

28. A non-transitory storage medium containing a program that causes a processing system to perform actions, comprising:
sending a data command from a first of a plurality of devices to a second address concentrator within a first of a plurality of processing systems, wherein each of the plurality of processing systems includes a first address concentrator and a second address concentrator, and the data command is for requesting data to be read from one of the plurality of processing systems;
selecting one of the other processing systems, the selected processing system storing the data addressed by the data command; and
sending the data command to the first address concentrator of the selected processing system from the second address concentrator of the first of the plurality of processing systems, without sending the data command to the first address concentrator of the first of the plurality of processing systems, wherein the data command is broadcasted from the first address concentrator of the selected processing system to the second address concentrator in each of the processing systems.

29. The storage medium of claim 28, wherein the data command is broadcasted from each second address concentrator to each of a plurality of devices within its processing system.

30. The storage medium of claim 29, wherein coherency responses to the broadcasted data command are received at each of the second address concentrators from the devices within its processing system.

31. The storage medium of claim 30, wherein the coherency responses are sent from each of the second address concentrators to the first address concentrator of the selected processing system.

32. The storage medium of claim 31, wherein:

combined coherency responses are received at the first address concentrator of the selected processing system; and the combined coherency responses are broadcasted from the first address concentrator of the selected processing system to each second address concentrator in each of the processing systems.

33. The storage medium of claim 32, wherein the combined coherency responses are broadcasted from each second address concentrator to each of the devices within its processing system.

34. A non-transitory storage medium containing a program that causes a processing system to perform actions, comprising:

sending a data command from a first of a plurality of devices to a second address concentrator within a first of a plurality of processing systems, wherein each of the plurality of processing systems includes a first address concentrator and a second address concentrator, and the data command is for requesting data to be read from one of the plurality of processing systems;

selecting one of the other processing systems, the selected processing system storing data addressed by the data command; and sending the data command to the first address concentrator of the selected processing system from the second address concentrator of the first of the plurality of processing systems, without sending the data command to the first address concentrator of the first of the plurality of processing systems, wherein the data command is sent from the first address concentrator of the selected processing system to the second address concentrator of the selected processing system.

* * * * *